(12) United States Patent
Woestemeyer et al.

(10) Patent No.: US 6,587,039 B1
(45) Date of Patent: Jul. 1, 2003

(54) METHOD AND DEVICE FOR THE OUTPUT OF OPERATING INFORMATION

(75) Inventors: Stefan Woestemeyer, Hildesheim (DE);
Ulrich Gaertner, Nordstemmen (DE);
Christopher Pflug, Hildesheim (DE);
Martin Kossira, Marbach Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 09/718,021

(22) Filed: Nov. 20, 2000

(30) Foreign Application Priority Data

Nov. 20, 1999 (DE) .......................................... 199 55 890

(51) Int. Cl.⁷ ................................................ B60Q 1/00
(52) U.S. Cl. .................... 340/425.5; 340/438; 340/459; 340/502
(58) Field of Search ............................. 340/425.5, 996, 340/995, 989, 988, 961, 971, 438, 439, 459, 460, 461, 502; 701/36, 1; 341/22, 23, 34

(56) References Cited

U.S. PATENT DOCUMENTS

| | | | | |
|---|---|---|---|---|
| 4,787,040 A | * | 11/1988 | Ames ............................. | 701/1 |
| 5,555,502 A | * | 9/1996 | Opel ............................ | 701/36 |
| 5,982,368 A | * | 11/1999 | Toffolo ........................ | 345/348 |
| 6,344,793 B1 | * | 2/2002 | Geck et al. .............. | 340/425.5 |

FOREIGN PATENT DOCUMENTS

| | | | | |
|---|---|---|---|---|
| DE | 690 06 885 | | 6/1994 | |
| DE | 43 43 871 | | 6/1995 | |
| DE | 195 33 541 | | 3/1997 | |
| DE | 19907795 A1 | * | 2/1999 | ............ B60Q/9/00 |
| DE | 197 56 297 | | 7/1999 | |

* cited by examiner

Primary Examiner—Van Trieu
(74) Attorney, Agent, or Firm—Kenyon & Kenyon

(57) ABSTRACT

A method and a device for the output of operating information for a driver information device having an output unit, an operating unit and a processing unit. Using the method and device, operating information for the functions of the driver information device can be output in a help state in a simple way.

11 Claims, 4 Drawing Sheets

METHOD AND DEVICE FOR THE OUTPUT OF OPERATING INFORMATION

FIELD OF THE INVENTION

The present invention relates to a method for outputting operating information for a driver information device.

BACKGROUND INFORMATION

Conventional driver information devices with help functions output operating information on a visual display unit in the form of whole screen pages. In order to grasp what is on the screen page, a vehicle driver must first read the screen page, thus must direct his attention to the driver information device. Therefore, using the help pages is only possible when the vehicle is standing still, since the driver would otherwise be too much distracted from events occurring in the traffic.

SUMMARY

A method according to an example embodiment of the present invention has the advantage that operating information is issued, in a simple manner and in short form, for only one function of the driver information device requested by the user. This also permits support for operation while driving, without causing the user to be severely distracted. Operating the driver information device is made easier for a user, since he can receive information in a simple manner on, for example, the keys of the driver information device. This is especially advantageous to the user of driver information devices unfamiliar to the driver, for instance, in a rented car, since the driver does not first have to read through possibly voluminous operating information, but can quickly inform himself on the functions of interest to him by switching to the help state of the driver information device.

When an input, for which operating information has been output, is immediately repeated, it is particularly advantageous if the function assigned to the input is carried out. This avoids an additional change from a help menu to a operating menu. Furthermore, the marking of keys, which generally requires more space than is necessary for the keys themselves, can be reduced, since operating information necessary to the user can be put at his disposal by means of the method according to the present invention.

It is also advantageous that the driver information device remain in a help state until this help state is ended by a further definite input of a user, for instance by the repeated pressing of an highlighted help key. This makes it particularly easy for a user who is using the driver information device for the first time to familiarize himself with the functions of the driver information device. In this embodiment, as long as the driver information device is in the help state, no actions are carried out, but rather only operating information is output, so that, even during erroneous operation, no settings can be changed or data deleted.

It is also advantageous that, after operating information is output, the driver information device switches back to the initial state. This is especially useful for users who already know the driver information device rather well, and who now only need information for a few, and in particular rarely used functions. These users can continue using the driver information device in the initial state, as usual, after the issuance of the operating information.

It is further advantageous that operating information continues to be output until the processing unit of the driver information device acquires a new input. Especially during the movement of the vehicle, the driver can only perceive the information offered by the driver information device in a fleeting way. If, for example, he is now briefly distracted by the happenings in traffic, the operating information is displayed until the display of the operating information is ended by him by a new input. For the same reasons, it is an advantage to keep displaying operating information as long as a keyed input is being received by the processing unit, that is, until the user has released the key.

Furthermore, it is advantageous that operating information is indicated in a display unit, for example a liquid crystal display, since in that manner the user can grasp it pictorially, and it can be supplemented, for instance, by pictures in the form of symbolic or photorealistic illustration. In this context, it is especially advantageous to reserve a certain area of the display unit for displaying operating information, since in that way, the glances of a user can be steered directly to this area. In addition, it is advantageous to put up the position of the displayed operating information as a function of the input acquired by the processing unit, since, in this way, the user can appreciate a connection between a key, arranged, for example, next to other keys on the display unit, and the operating information issued.

Moreover, it is advantageous to issue the operating information via voice output, since, using voice output, the user does not have to avert his glance from the traffic happenings.

Additionally, it is advantageous to provide a device for carrying out the method with a help key, with the use of which the driver information device can be switched from an initial state to a help state, and with respect to the detected inputs, operating information for the driver information device function allocated to the input in the initial state can be output by a processing unit from a storage unit via the output unit.

DETAILED DESCRIPTION

Figure 1:
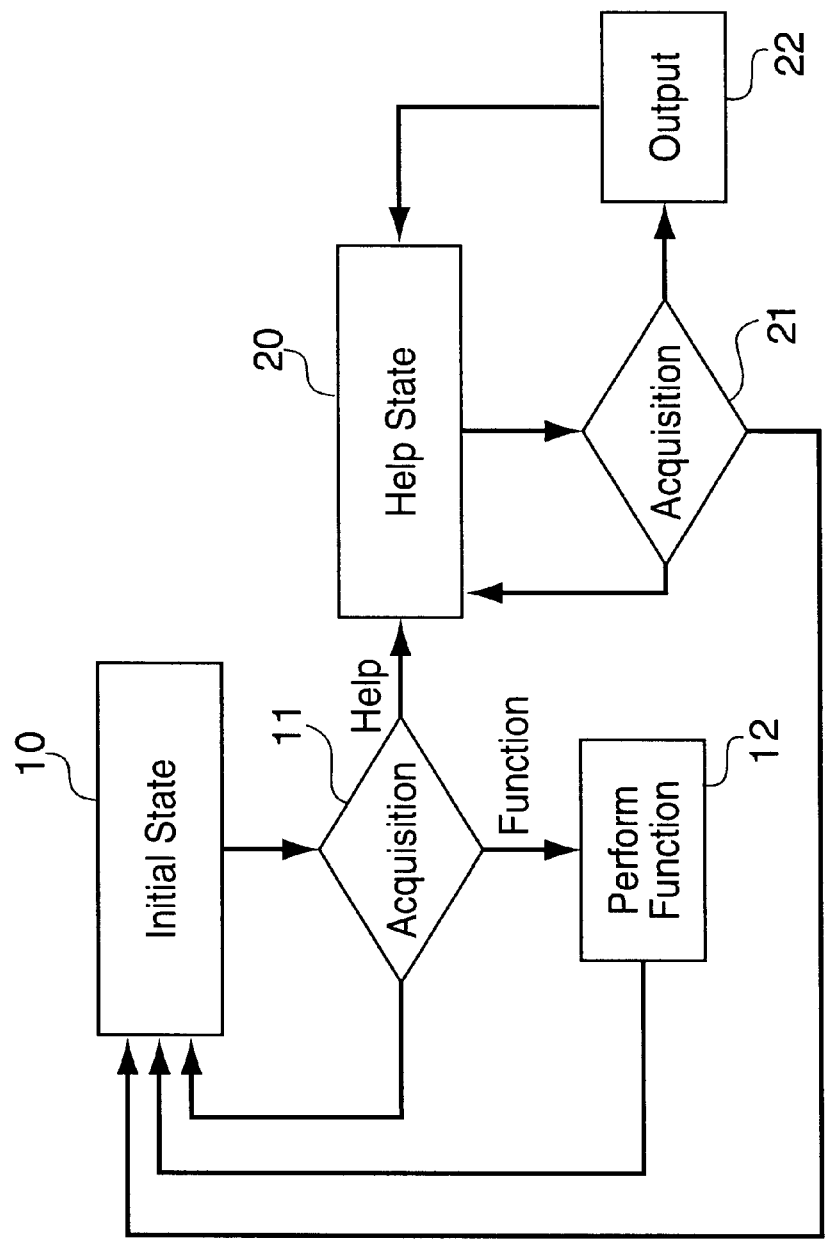
FIG. 1 shows a first method for the output of operating information for a driver information device, according to an example embodiment of the present invention.

In FIG. 1, a first method for the output of operating information for a driver information device is illustrated. The driver information device, which is ready to operate, is first in an initial state 10. Starting from initial state 10, a first acquisition step 11 takes place. In the first acquisition step 11 the possible operating units, by which the user can transmit input to the driver information device, are polled. These operating units may be a permanent keyboard with fixed, assigned functions, a keyboard with variably assigned functions, a touch-screen display, in which different areas of the screen surface have assigned to them certain functions, or a voice input in which functions of the driver information device are assigned to certain voice signals.

In the first data input step 11, a processing unit of the driver information device checks whether a valid input has occurred. If the processing unit does not identify a valid input, branching back to the initial state 10 takes place. An example of an invalid input is, for instance, the simultaneous depression of a plurality of keys or an incomprehensible voice input. After a predefined time interval, for example, between 10 ms and 50 ms, the first acquisition step 11 is repeated. If, however, the processing unit registers the input of a function of the driver information device, branching to function 12 takes place. The desired function, e.g., "destination input" or "play traffic broadcast", is carried out by the driver information device by calling up, for a function "destination input", for example, a destination input for a driving destination for a navigation function, or by issuing, via a loudspeaker, for the function "play traffic broadcast", for example, the most recent traffic news detected by a radio unit of the driver information device. After the execution of function 12, branching back to the initial state 10 of the driver information device takes place.

In the first acquisition step 11, the processing unit registers the operation of a help key or the voice input registers "help", branching takes place from the first acquisition step 11 to the first help state 20. Branching from the first help state to the second acquisition step 21 takes place by having the central processor test whether an input has occurred, just as with the first acquisition step 11. If the processing unit detects no input, branching backward to the first help state 20 occurs, and after a predefined time interval, for example, 10 ms to 50 ms, branching to the second acquisition step 21 takes place again. In the second acquisition step 21, if the processing unit ascertains the input "end help", branching backward to the initial state 10 takes place. In a preferred exemplary embodiment, the input "end help" is given by a renewed confirmation by the help key. In the second acquisition step 21, if a different input from the input "end help" is detected by the processing unit, the processing unit ascertains which function of this input is assigned to the driver information device in the initial state 10, or which function 12 was executed according to this input after the first acquisition step 11.

Thereafter branching takes place to help output 22. In help output 22 there follows the output of operating information on the function ascertained by the processing unit in the second acquisition step 21. The output can be via a screen unit or a voice output. The operating information is stored in a memory unit assigned to the processing unit and is called up by the processing unit from the memory unit and is output via the voice output or the screen. Subsequently, branching backward from the help output 22 to the first help state 20 takes place. During this, the driver information device remains in the first help state until this first help state 20 is terminated by an input "end help" in the second acquisition step 21, and branching backward to the initial state 10 takes place.

Figure 2:
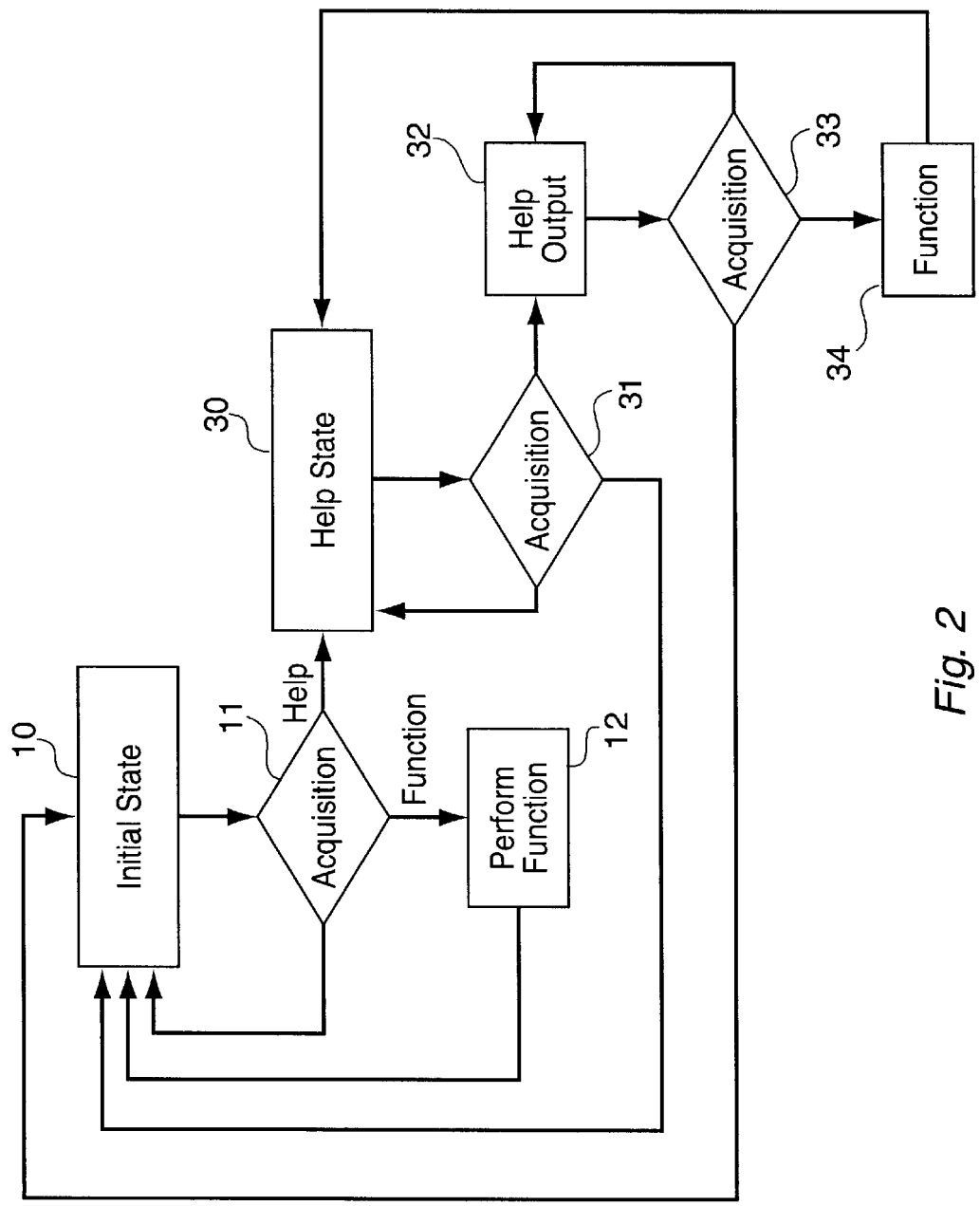
FIG. 2 shows a further example embodiment of a method for the output of operating information.

In FIG. 2 a further exemplary embodiment of a method for the output of operating information for a driver information device is illustrated. The same reference numerals, here and in the following, stand for the same elements of the method From the initial state 10 branching takes place to the first acquisition step 10, and, under the same conditions as described in connection with the method in FIG. 1, branching takes place to a function 12. If the help key is operated or "help" is input via the voice input, as described in connection with FIG. 1, branching to a second help state 30 takes place. From the second help state 30, as from the first help state 20 to the second acquisition step 21 in FIG. 1, branching occurs to a second acquisition step 31. If no input is detected by the processing unit, branching backward takes place to the second help state 30. If an input is detected, which specifies that help is being ended, branching backward to the initial state 10 takes place. If another valid input is detected, the processing unit ascertains, in a help output 32, which function of the driver information device is assigned to the input in the initial state, and an operating information for this function is output. Subsequently, further branching to a third acquisition step 33 takes place. If an input is detected in the third acquisition step 33, which specifies that help is to be ended, further branching backward to the initial state 10 takes place. If, however, the prior input, which has already been detected in the second acquisition step 31, is detected again, further branching occurs to function 34, which is assigned to the input in the initial state, and function 34 is executed by the driver information device. Subsequently backward branching to the second help state takes place. If an input is detected in the third acquisition state 33, which is assigned to another function, in the initial state 10, than the one to which an operating information has just been issued, branching backward to help output 32 takes place, and operating information is output for the function assigned in the initial state 10 to the input detected in the third acquisition step 33. On the one hand, the driver information device returns, in this manner, to the second help state 30, as long as no end help is input, but on the other hand it is also possible to call up functions.

Figure 3:
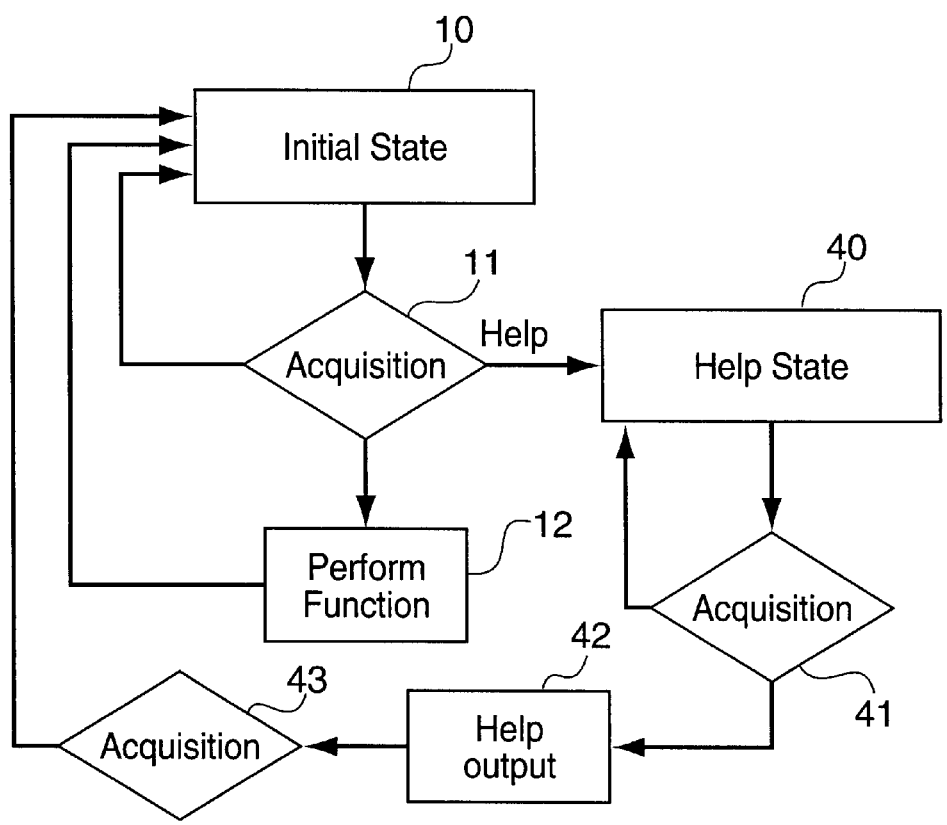
FIG. 3 shows a further method for the output of operating information.

In FIG. 3 a further method for the output of operating information for a driver information device is illustrated. The initial state 10, the first acquisition step 11 and function 12 are described above in connection with FIGS. 1 and 2. If the help key is depressed in the first acquisition step 11, or if the function "help" is selected, further branching to a third help state 40 will occur. From the third help state, further branching to a second acquisition step 41 takes place. If no input is detected by the processing unit in the second acquisition step 41, branching backward to the third help state 40 takes place. If, on the other hand, an input is detected, further branching to the help output 42 takes place, in which operating information is output for the function assigned in the initial state 10 of the driver information device to the input detected in the second detection step. Subsequently, further branching to a third acquisition step 43 takes place. In a first exemplary embodiment of the method according to FIG. 3, branching backward to the initial state 10 takes place in the third acquisition step 43, after a predefined time span, for example, between 5 s and 10 s. An acoustic help output is terminated and/or an indication of operating information in text form in the display is faded out. In a second exemplary embodiment according to the method as in FIG. 3, further branching takes place from the third acquisition step 43 to the initial state 10 as soon as a key of the operating unit of the driver information device is operated again, or as soon as a new voice input occurs. In a third exemplary embodiment, further branching from the third acquisition step 43 to the initial state 10 takes place as soon as a key, with which the input was carried out in the second acquisition step 41, is released by a user. In the method according to FIG. 3, an output of an operating information always goes only to a function. In order to receive anew an output of an operating information, the third help state 40 must again be brought in.

Figure 4:
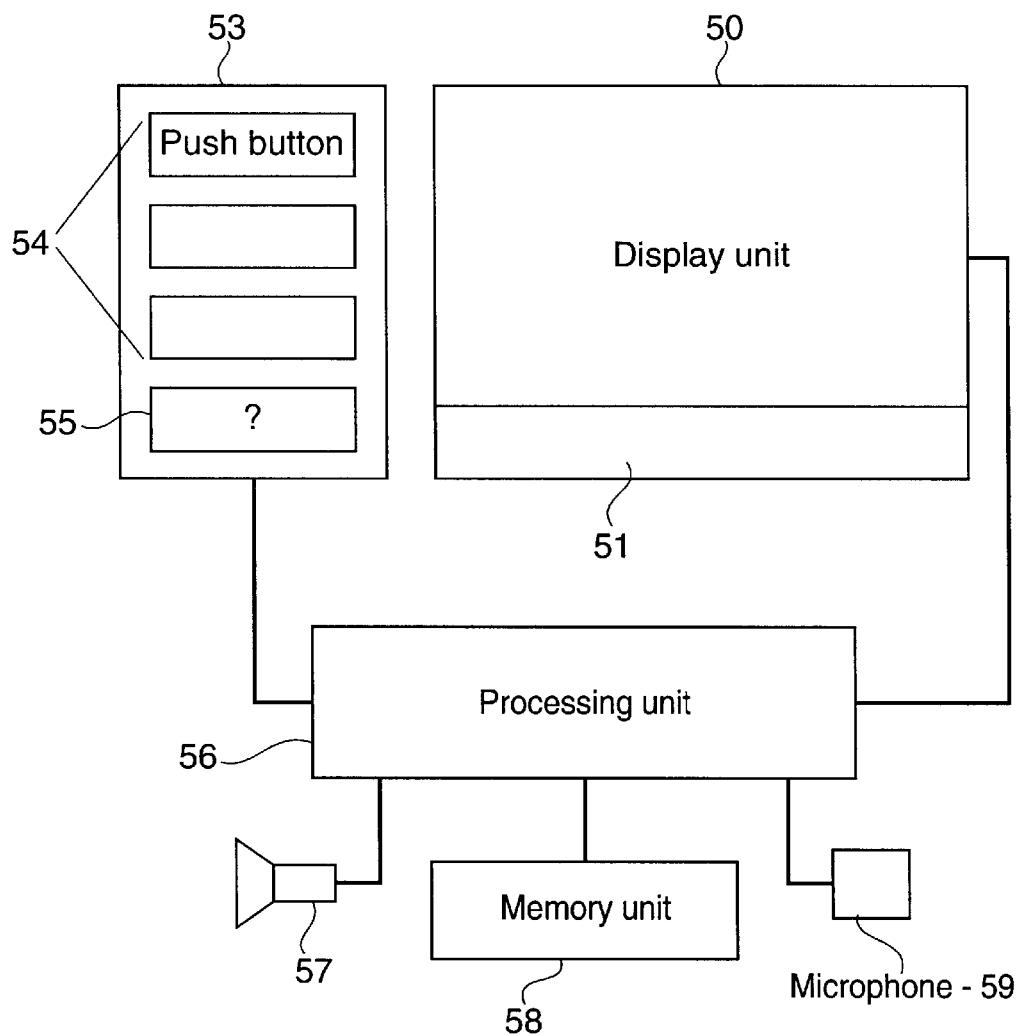
FIG. 4 shows a driver information device for carrying out the method for the output of operating information according to an example embodiment of the present invention.

FIG. 4 illustrates an example driver information device for carrying out the method according to the present invention. The driver information device includes a processing unit 56 connected to a display unit 50, an operating unit 53, a loudspeaker 57, a memory unit 58 and a microphone 59. In this configuration, the processing unit 56 may be in a location not visible to the vehicle's user, e.g., behind the dashboard of the vehicle. The display unit 50 is located so as to be easily visible to the driver of the vehicle, e.g., in the middle console or next to a speed indicator behind the steering wheel. The display unit 50 may be, for example, a liquid crystal display. Additionally, for example, a design as cathode ray tube display or as projection display on the windshield is a possibility. In the display unit 50, data of the driver information device are represented optically. This can be done with the output of text, numbers and/or graphics. A display area 51 of the display unit 50 is shown in FIG. 4 in highlighted form. In a preferred exemplary embodiment the operating information is issued in display area 51, which is located, for instance, at a lower edge of the display surface 50, so that during fade-in of the operating information, the remaining display surface is not altered, and thus the driver is disturbed as little as possible by the fading-in of the operating information Preferably, the fading-in of operating information takes place only at the user's request.

The operating unit 53 has push buttons. The operating unit also has a help key 55, which is especially emphasized in FIG. 4. When processing unit 56 registers an operation of help key 55, the processing unit 56 switches the driver information device from the initial state to a help state. Besides the push buttons 54, other operating elements are possible too, not shown, however, in FIG. 4, as, for instance, rocker keys or rotary buttons. Furthermore, the operating unit 53 can be integrated into the steering wheel of the vehicle, or the operating unit 53 can be positioned directly at the display unit. The display unit 50 may also be, for example, a touch-screen display, in which the operating unit 53 is integrated into the display surface of the display unit 50.

The operating information to the individual functions of the driver information device is stored in memory unit 58. In addition to the output via display unit 50, an output via loudspeaker 57 is also possible as voice output. Thus, the possible output units are display unit 50 and loudspeaker 57. By the use of microphone 59, the processing unit 56 can register the spoken commands of a user. Further components of the driver information device, as for example, a radio antenna, a GPS antenna for locating the vehicle, a disk drive for magnetic and/or optical data carriers, e.g., for music or navigation may be connected to the processing unit 56.

The operating information may be used for making available explanations on the selected function, or to inform a user in the first place as to which function the driver information device is executing, when he operates the corresponding key.

The operating information can be given in text form, via a text output on a viewing screen and/or via a voice output, and can also contain a direction to activate another function, e.g. "destination input" before "destination start" in the case of a navigation function. For the illustration in the display area 51 of the display unit 50, supplementation by means of a symbolic illustration is also possible.

The driver information device may be designed at least as a navigation device. However, it can also be designed in the form of other devices, e.g., radio, traffic news service, climate control, telephone operation, CD/MD player operation and/or Internet operation. The customary functions of these pieces of equipment can be called in via operating unit 53 or is microphone 59.

The following is an exemplary explanation of a driver information device encompassing radio and a CD player. For this, the operation according to the exemplary embodiment described in FIG. 2 is explained for the method according to the present invention. The driver information device is first in a "radio" state and a selected station name and/or station frequency is displayed in display unit 50. A first pushbutton is used for switching between radio and CD. Two further pushbuttons are marked "forwards" and "backwards". The help key 55 is also present. If a user first presses the help key, the display unit 50, for example, in display area 51, indicates by a suitable symbol, e.g., "?" or a corresponding information text, for example "help function", that the driver information device is now in a help state. If a user now presses the switching key between radio and CD, the display area 51 displays: "Change to CD". However, the radio remains active; the selected station remains faded in. If the user now presses the switch button between radio and CD a second time, preferably within a predefined time span, e.g., 20 s, switching to the CD player takes place. The title of the CD or the title of the first song is indicated and the first song is played.

Furthermore, in display area 51 it is displayed that the driver information device is still in a help state. If the user now presses the "forward" key, in the display area "next title" is faded in. If the user now presses the "forward" key a second time, the next title is played. If the user now presses the help key again, the display area 51 is emptied or faded out, and the driver information device is in the initial state again.

What is claimed is:

1. A method for outputting operating information for a driver information device in a vehicle, the driver information device including an output unit, an operating unit and a processing unit, the method comprising:

detecting by the processing unit a first specific input via the operating unit;

after the detecting step, switching by the processing unit the driver information device from an initial state to a help state;

while in the help state, detecting a first further input;

determining a function of the driver information device, the function being associated with the further first input when the driver information device is in the initial state; and outputting by the output unit operating information concerning the determined function.

2. The method according to claim 1, further comprising:

while in the help state, detecting a repetition of the further first input; and after detecting the repetition, performing by the processing unit the determined function.

3. The method according to claim 1, further comprising:

while in the help state, detecting second further inputs, one at a time;

for one of the second further inputs at a time, determining an allocated function, the allocated function being associated with the one of the second further inputs when the driver information device is in the initial state;

while in the help state, detecting a second specific input; and after detecting the second specific input, switching by the processing unit the driver information device from the help state to the initial state.

4. The method according to claim 1, further comprising:

the outputting step, switching by the processing unit the driver information device from the help state to the initial state.

5. The method according to claim 1, further comprising:

issuing the operating information until a new input is detected by the processing unit.

6. The method according to claim 1, wherein the operating information is output for a duration of a predefined time span.

7. The method according to claim 1, wherein the operating information is output as long as a key input is detected by the processing unit.

8. The method according to claim 1, wherein the first specific input is input via one of: i) a fixed key of the driver information device, ii) a variable key of the driver information device, and iii) via a voice input.

9. The method according to claim 1, wherein the operating information is displayed via a display unit.

10. The method according to claim 9, wherein the operating information is displayed in an area of the display unit reserved for displaying operating information.

11. The method according to claim 1, wherein the operating information is output via a voice output.

* * * * *